US009245497B2

(12) United States Patent
Pais et al.

(10) Patent No.: US 9,245,497 B2
(45) Date of Patent: Jan. 26, 2016

(54) SYSTEMS AND METHODS FOR CONFIGURING THE DISPLAY RESOLUTION OF AN ELECTRONIC DEVICE BASED ON DISTANCE AND USER PRESBYOPIA

(71) Applicant: Motorola Mobility LLC, Libertyville, IL (US)

(72) Inventors: Martin R Pais, North Barrington, IL (US); Sylvia Chen, Deerfield, IL (US)

(73) Assignee: Google Technology Holdings LLC, Mountain View, CA (US)

( * ) Notice: Subject to any disclaimer, the term of this patent is extended or adjusted under 35 U.S.C. 154(b) by 177 days.

(21) Appl. No.: 13/666,499

(22) Filed: Nov. 1, 2012

(65) Prior Publication Data

US 2014/0118354 A1 May 1, 2014

(51) Int. Cl.
G06T 17/00 (2006.01)
G09G 5/373 (2006.01)
G06F 3/14 (2006.01)

(52) U.S. Cl.
CPC *G09G 5/373* (2013.01); *G06F 3/14* (2013.01); *G09G 2340/0407* (2013.01); *G09G 2350/00* (2013.01); *G09G 2370/022* (2013.01); *G09G 2370/04* (2013.01)

(58) Field of Classification Search
CPC ....... G06F 3/016; G06F 3/017; G06F 1/1626; G06F 3/0346; G06F 3/038; G06F 2203/04806; G06F 2203/04805; G06F 3/14; G06K 9/00228; G06K 9/00221; G06K 9/00281; G06K 9/00248; G06K 9/00604; G06K 9/00597; G06K 9/0061; G06K 9/00268; G06K 9/00335; G06K 9/00295; G09G 2340/0407; G09G 5/00; G09G 5/006; G09G 5/14; G09G 2340/0414; G09G 2340/0421; G09G 2340/045; G09G 5/373; G09G 2350/00; G09G 2370/022; G09G 2370/04; H04N 21/2343; H04N 13/0468

USPC ........ 345/156, 158, 207, 428, 619, 660, 698, 345/699; 348/77, 140; 351/208–210; 382/106, 117, 118; 606/12
See application file for complete search history.

(56) References Cited

U.S. PATENT DOCUMENTS 5,632,742 A 5/1997 Frey et al.
6,322,216 B1 11/2001 Yee et al.
(Continued)

FOREIGN PATENT DOCUMENTS

| JP | 2007-65542 A | 3/2007 |
|---|---|---|
| JP | 2011-123501 A | 6/2011 |
| WO | 2007138394 A1 | 12/2007 |
| WO | 2012015460 | 2/2012 |
| WO | 2013131418 A1 | 9/2013 |

OTHER PUBLICATIONS

Wikipedia, "Visual Acuity", http://en.wikipedia.org/wiki/Visual_acuity, Oct. 13, 2012, 14 pages.
(Continued)

*Primary Examiner* — Lun-Yi Lao
*Assistant Examiner* — Elliott Deaderick
(74) *Attorney, Agent, or Firm* — Troutman Sanders LLP; James E. Schutz; Christopher W. Glass

(57) ABSTRACT

Systems and methods dynamically configure a display of an electronic device to a desired display resolution and/or a magnification factor without noticeable impact on the user viewing experience. According to certain aspects, the distance between a user and the display is measured, and the desired display resolution is determined based on the distance. If a user is exhibiting symptoms of presbyopia, a magnification factor may be determined. A request indicating the desired display resolution and/or magnification factor is transmitted to a server that supplies images, such as pictures or videos. The image is received from the server and displayed on the display. A focus area distance and/or a pupil orientation of the user may also influence the desired display resolution.

22 Claims, 10 Drawing Sheets

(56) References Cited

U.S. PATENT DOCUMENTS

| | | | |
|---|---|---|---|
| 6,466,198 B1* | 10/2002 | Feinstein | G06F 1/1626 345/158 |
| 7,480,396 B2 | 1/2009 | Teiwes et al. | |
| 7,517,086 B1* | 4/2009 | Kurkure | 351/246 |
| 7,924,297 B2 | 4/2011 | Morikawa et al. | |
| 2002/0113782 A1 | 8/2002 | Verberne et al. | |
| 2002/0180733 A1 | 12/2002 | Colmenarez et al. | |
| 2005/0001815 A1 | 1/2005 | Tsunoda | |
| 2008/0049020 A1 | 2/2008 | Gusler et al. | |
| 2008/0062297 A1* | 3/2008 | Sako | G02B 27/017 348/333.02 |
| 2008/0074444 A1 | 3/2008 | Morikawa et al. | |
| 2009/0164896 A1 | 6/2009 | Thorn | |
| 2009/0207195 A1 | 8/2009 | Chin et al. | |
| 2009/0315924 A1 | 12/2009 | Chou | |
| 2010/0250765 A1 | 9/2010 | Riggert et al. | |
| 2010/0305411 A1* | 12/2010 | Paul | 600/301 |
| 2011/0106595 A1 | 5/2011 | Vande Velde | |
| 2011/0141114 A1 | 6/2011 | Chen et al. | |
| 2011/0148930 A1 | 6/2011 | Lee et al. | |
| 2011/0148931 A1 | 6/2011 | Kim | |
| 2011/0149059 A1 | 6/2011 | Alberth | |
| 2011/0164122 A1* | 7/2011 | Hardacker | H04N 13/0425 348/53 |
| 2011/0211114 A1 | 9/2011 | Cooper | |
| 2011/0273369 A1 | 11/2011 | Imai et al. | |
| 2011/0273466 A1 | 11/2011 | Imai et al. | |
| 2011/0273731 A1 | 11/2011 | Haikin et al. | |
| 2012/0050269 A1 | 3/2012 | Awaji | |
| 2012/0146891 A1 | 6/2012 | Kalinli | |
| 2012/0200593 A1 | 8/2012 | Todd et al. | |
| 2012/0262477 A1 | 10/2012 | Buchheit | |
| 2012/0287031 A1 | 11/2012 | Valko et al. | |

OTHER PUBLICATIONS

Ryan Latchman et al, "Key Requirements for Ultra High-Definition Television", www2.electronicproducts.com, Aug. 28, 2012, pp. 49-51.

Gadgetbench, "Viewing Distance and Screen Size", http://www.gadgetbench.com/screensize/, 2006, 5 pages.

Wikipedia, "Eyeglass Prescription", http://en.wikipedia.org/wiki/Eyeglass_prescription, Oct. 30, 2012, 12 pages.

Freedom Scientific, "Desktop Video Magnifier, Now in High Definition for Improved Reading Performance", http://www.freedomscientific.com/adwords/TOPAZ-RUBY-MAGIC.html?gclid=CMnl1, printed Oct. 31, 2012, 3 pages.

Numerical Example, "Reading Glasses", http://www.numericalexample.com/index.php?view=article&id=13, Mar. 29, 2006, 1 page.

Wikipedia, "Optimum HDTV Viewing Distance", http://en.wikipedia.org/wiki/Optimum_HDTV_viewing_distance, Oct. 23, 2012, 11 pages.

Carlton Bale, "1080p Does Matter—Here's When (Screen Size vs. Viewing Distance vs. Resolution", http://carltonbale.com/1080p-does-matter/, Oct. 25, 2012, 20 pages.

Irisom, "Eye Tracking", http://iriscom.org/webant/e_control_iris.htm, printed Apr. 28, 2010, 1 page.

Patent Cooperation Treaty, "PCT Invitation to Pay Additional Fees" for Int'l Pat. Appln. No. PCT/US2013/065837, Jan. 17, 2014, 6 pages.

United States Patent and Trademark Office, "Non-Final Rejection" for U.S. Appl. No. 13/666,482, Feb. 28, 2014, 16 pages.

Patent Cooperation Treaty, "PCT Search Report and Written Opinion of the International Searching Authority" for Int'l Pat. Appln. No. PCT/US2013/065837, Mar. 12, 2014, 25 pages.

Patent Cooperation Treaty, "PCT Search Report and Written Opinion of the International Searching Authority" for Int'l Pat. Appln. No. PCT/US2013/065571, Mar. 14, 2014, 10 pages.

"Vision-correcting display would eliminate need for glasses." Online, Internet: http://www.electronicproducts.com/Analog_Mixed_Signal_ICs/Drivers_Displays_LED_etc_/Vision_correcting_display_would_eliminate_need_for_glasses.aspx. Last Accessed: Oct. 7, 2014.

* cited by examiner

SYSTEMS AND METHODS FOR CONFIGURING THE DISPLAY RESOLUTION OF AN ELECTRONIC DEVICE BASED ON DISTANCE AND USER PRESBYOPIA

FIELD

This application generally relates to configuring the display resolution of an electronic device based on distance and user presbyopia. In particular, the application relates to utilizing a distance between a user and a display of the electronic device and whether the user has a presbyopia condition to dynamically determine an optimal display resolution of the display without noticeable impact on the user viewing experience.

BACKGROUND

Higher display resolutions may require a large amount of data to represent the number of pixels of an image, and accordingly, that large amount of data may need to be transferred to the electronic device from the server. Transferring the large amount of data may utilize a significant portion of the available bandwidth from the server to the electronic device. Moreover, other network traffic may impede the transfer of data to the electronic device. As a result, the images may not be timely received and may not be displayed smoothly, there may not be enough bandwidth for other applications executing on the electronic device, the network transferring the data gets congested, and the user may consume excessive amounts of data, resulting in overage charges.

Furthermore, a processor of the electronic device rendering the images may need to process the large amount of data for images at the higher display resolution. Processing the large amount of data may utilize significant processing time and/or overtax the processor, resulting in higher power consumption, higher temperatures, and possibly degraded performance. Consequently, the images may not be rendered or displayed smoothly, and other applications on the electronic device may be slowed. The power usage of the electronic device may also increase significantly due to the higher bandwidth and processing needs for the images at the higher display resolution.

Accordingly, there is an opportunity for systems and methods that address these bandwidth, processing, and power concerns without noticeably impacting user viewing experience.

BRIEF DESCRIPTION OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed embodiments, and explain various principles and advantages of those embodiments.

DETAILED DESCRIPTION

Figure 1:
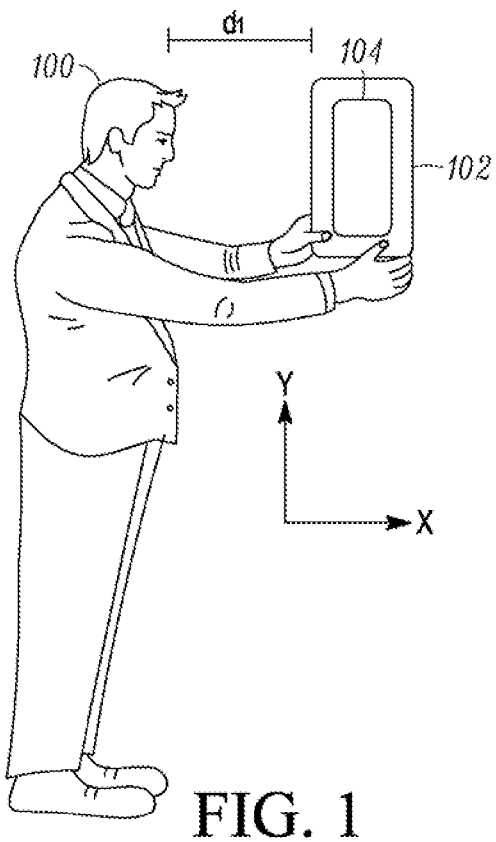
FIG. 1 depicts a user viewing a display of an electronic device at a distance in accordance with some embodiments.

Systems and methods dynamically configure an electronic device display that supports a plurality of display resolutions to a particular display resolution. According to one embodiment, the electronic device measures a distance between its display and a user of the electronic device and determines a desired display resolution, based on the distance. The electronic device may also determine whether the user is exhibiting symptoms of presbyopia and, if the user is exhibiting symptoms of presbyopia, the device can find a desired magnification factor. A request indicating the desired display resolution and/or the desired magnification factor may be transmitted to a server external to the electronic device, where the server is capable of supplying an image, such as pictures and videos. According to another embodiment, an electronic device includes a distance measurement component for measuring a distance between its display and a user of the electronic device and a presbyopia detection component for determining whether the user is exhibiting symptoms of presbyopia. The electronic device also includes a transceiver, a processor, and optionally other components. The processor may receive the distance from the distance measurement component, determine a desired display resolution based on the distance, receive presbyopia data from the presbyopia detection component, determine a desired magnification factor based on the presbyopia data, and transmit a request indicating the desired display resolution and/or the desired magnification factor using the transceiver to a server external to the electronic device. The electronic device may receive an image, such as pictures and videos, from the server.

The systems and methods as discussed herein can offer improvements to existing technologies. In particular, the desired display resolution and/or the desired magnification factor may be changed if a change in the distance between the user and the display is detected and the change exceeds a predetermined distance threshold. A pupil orientation of the user with respect to the display may be determined that corresponds to a focus area on the display of a pupil of the user. A focus area distance between the display and the pupil of the user may be calculated based on the distance and the pupil orientation, and a desired display resolution may be determined based on the focus area distance. Changes to the pupil orientation can be detected, which can result in determining the desired display resolution if the change in the calculated focus area distance exceeds a predetermined focus area distance threshold. Determining whether the user is exhibiting symptoms of presbyopia may include recognizing the squinting of the eyes of the user, recognizing that the user should be wearing multifocal glasses that are normally worn, or identifying a back and forth movement of the electronic device. The amount of data transferred to the electronic device from a remote server may be reduced, with commensurate savings in bandwidth, processing, and power, for example, when a non-maximum display resolution is requested due to the distance being too great for the user's eyes to resolve the maximum display resolution. It should be appreciated that other benefits and efficiencies are envisioned.

Figure 2:
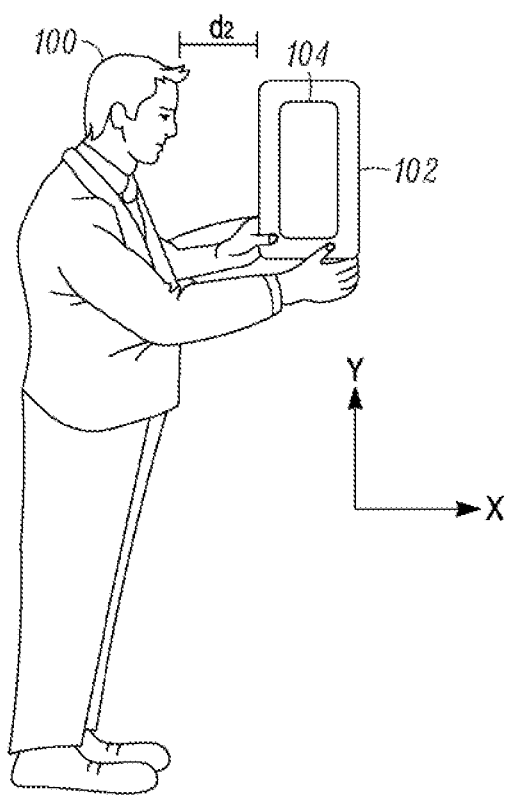
FIG. 2 depicts a user viewing a display of an electronic device at another distance in accordance with some embodiments.

FIGS. 1 and 2 depict examples of an electronic device 102 with a display 104 in which embodiments may be implemented. The electronic device 102 may be stationary or portable and may be, for example, a smartphone, a cellular phone, a personal digital assistant, a tablet computer, a laptop computer, a networked television set, or the like. A user 100 may view the display 104 at different distances, such as a distance $d_1$ in FIG. 1 and a shorter distance $d_2$ in FIG. 2. The distance between the user 100 and the display 104 may vary depending on the particular usage of the electronic device 102 and the personal preferences of the user 100. The user 100 may hold the electronic device 102 with one or more hands, as in FIG. 1. The distance between the display 104 and the user 100 in FIG. 1 is a distance $d_1$. In contrast, the electronic device 102 may also be held with one or of more hands by the user 100, as in FIG. 2, but at a distance $d_2$ that is less than the distance $d_1$ of FIG. 1.

The user 100 may vary the distance between himself and the display 104 because the user 100 has a presbyopia condition. Presbyopia is a condition where the lens of the eye loses the ability to focus on objects nearer to the eye. The lens of the eye is elastic and changes its length or shape when focusing on nearer objects, as compared to focusing on farther objects. As a person ages, the lens becomes less elastic, harder, and less able to accommodate a wide range of distance. Accordingly, the ability to focus on nearer objects decreases. The ability to see in dim light may also be affected. Without corrective lenses, a person with presbyopia may reflexively squint, or move themselves or the display 104 back and forth to adjust their focus. A person with presbyopia may also hold objects, such as reading material, farther away in order to properly focus on the objects. People may wear multifocal eyeglasses (e.g., bifocal eyeglasses, trifocal eyeglasses, progressive lens eyeglasses, etc.), reading glasses, multifocal contact lenses, and/or monovision contact lenses to correct a presbyopia condition.

The user 100 in FIG. 1 is an exemplary person with presbyopia who needs to hold the electronic device 102 at arm's length to focus on the display 104. Other persons with presbyopia may move the electronic device 102 in a back and forth movement in an attempt to focus on the display 104. For example, the user 100 may move the electronic device 102 between the distance $d_1$ and the distance $d_2$ in FIGS. 1 and 2, respectively, to focus on the display 104, depending on the size of the objects the user 100 is trying to view and focus on. It should be noted that in FIGS. 1-8, the x-axis is depicted as horizontally across the display 104, the y-axis is depicted as vertically up and down the display 104, and the z-axis is depicted as perpendicular to the display 104 of the electronic device 102. The back and forth movement of the electronic device 102 by persons with presbyopia is primarily in the z-axis.

In the scenarios depicted in FIGS. 1 and 2, the user 100 may be, for example, reading the text of e-mails and web pages; viewing images, such as pictures and videos; playing video games; and/or otherwise interacting with the electronic device 102. Generally, the eyes of the user 100 may perceive a resolution of approximately 5 arc-minutes, assuming the user 100 has a normal visual acuity of 20/20. A user 100 may have the normal visual acuity of 20/20 with or without corrective lenses. The perceived resolution of 5 arc-minutes may allow the eyes of the user 100 to differentiate a size $\Delta x$ of a feature on an object, such as an image element on the display 104, at a distance d from the object, according to the equation $\Delta x = d*\pi/180*5/60$. Accordingly, at a distance of 1 m, the eyes of the user 100 can differentiate a feature with the size $\Delta x$ of 1.4 mm. If the user 100 is farther away, then the feature would not be distinguishable to the eyes of the user 100. In the case of the display 104, the size $\Delta x$ of the feature may correspond to a pixel of the display 104.

For a display 104 that is of a certain size and can support particular display resolutions, a maximum distance between a user 100 and the display 104 can be determined that will maximize the visual sharpness and clarity of the images being shown on the display 104. If the user 100 is farther than the maximum distance, then the eyes of the user 100 cannot perceive features, e.g., pixels, with a smaller size $\Delta x$. Therefore, such features with the smaller size $\Delta x$ may not need to be shown to the user 100 on the display 104 at certain farther distances since the user 100 cannot perceive these features. As such, the display resolution of the display 104 may be adjusted, i.e., reduced, so that the features with the smaller size $\Delta x$ are not displayed. For a user 100 with presbyopia, the user 100 may also have a minimum distance such that if the user is closer than the minimum distance, then the eye of the user 100 cannot focus on close-up objects. The electronic device 102 may also dynamically magnify the size of the features by a positive or negative magnification factor so that the features are discernible to the user 100. The electronic device 102 may implement dynamic configuration of the display resolution and/or magnification factor by measuring the distance between the user 100 and the display 104, determining a desired display resolution of the display 104 based on the distance, determining whether the user is exhibiting symptoms of presbyopia, determining a desired magnification factor if the user is exhibiting symptoms of presbyopia, and transmitting a request including the desired display resolution and/or the desired magnification factor to a server supplying images.

Several benefits may result because the display resolution may be reduced from a higher display resolution or because the display is magnified while maintaining the user viewing experience. In particular, the electronic device 102 may require a smaller amount of data to represent images, if the images are at a lower display resolution and/or if only a portion of the image is needed due to the magnification of the image. Accordingly, a smaller amount of data may be transferred to the electronic device 102 from a server supplying the images, and network traffic between the server and the electronic device 102 may be reduced. The processor of the electronic device 102 that renders the images based on the data may process the smaller amount of data and, hence, free the processor to perform other tasks. The images may also be rendered and displayed more quickly and smoothly because there is less data to receive and process. Less storage and cache space may be utilized on the electronic device 102 because of the smaller amount of data. Furthermore, the power consumption may be reduced and battery life of the electronic device 102 may be lengthened because less data needs to be received and processed. The reduced power consumption may lead to savings in current drain and heat dissipation with an associated reduction in the temperature of the electronic device 102. The server supplying the images may also benefit because less data needs to be sent to the electronic device 102.

For example, the display 104 may be able to support display resolutions of PAL or 576i (720×576), 720p (1280×720), and 1080p (1920×1080). The PAL display resolution has 414,720 pixels, the 720p display resolution has 921,600 pixels, and the 1080p resolution has 2,073,600 pixels. If the images received by the electronic device 102 can be rendered at one of the lower display resolutions, it can be seen that the data representing the number of pixels of an image can be significantly reduced. In particular, if the images can be displayed at a display resolution of 720p instead of 1080p, or at PAL instead of 720p, then the number of pixels is more than halved.

As another example, if the user 100 is exhibiting symptoms of presbyopia, the image on the display 104 could be magnified so that the user 100 can discern features of the image. If the magnified image is larger than the size of the display 104, then several techniques could be used to display only the magnified portions of the image for the user 100 to view. One technique may include cropping portions of the image that are on the borders of the image and only receiving and/or displaying the central portions of the image. Another technique may include using a magnifying glass-type view of the image so that the portion of the image the user 100 is focused upon is magnified. In this technique, either the magnifying glass could move with the pupil orientation of the user 100, or the image could move underneath the magnifying glass. A further technique may include scrolling a magnified portion of an image sideways and down with the pupil orientation of the user 100. This technique may work well with text and may move and scroll the pertinent magnified portion of the image corresponding with the reading speed of the user 100. In some embodiments, the images and/or text that are outside of the magnified portion could be blank. In each of the above examples for display resolution and magnification, the amount of data to represent the pixels is reduced, resulting in bandwidth, processing, and power savings.

Figure 3:
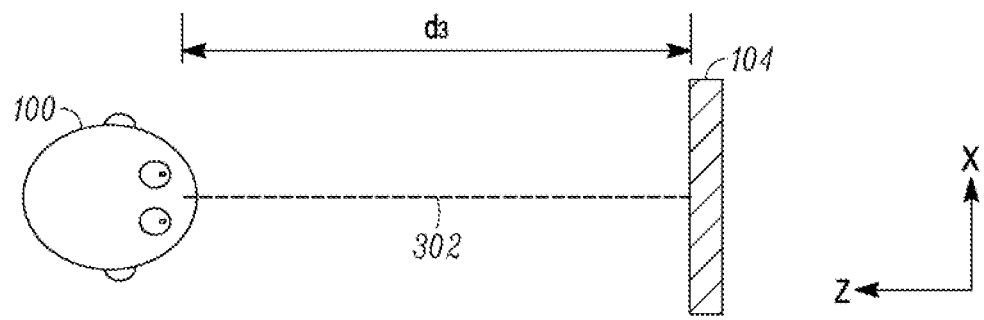
FIG. 3 depicts a user situated at the center of the display of the electronic device viewing the center of the display in accordance with some embodiments.
Figure 4:
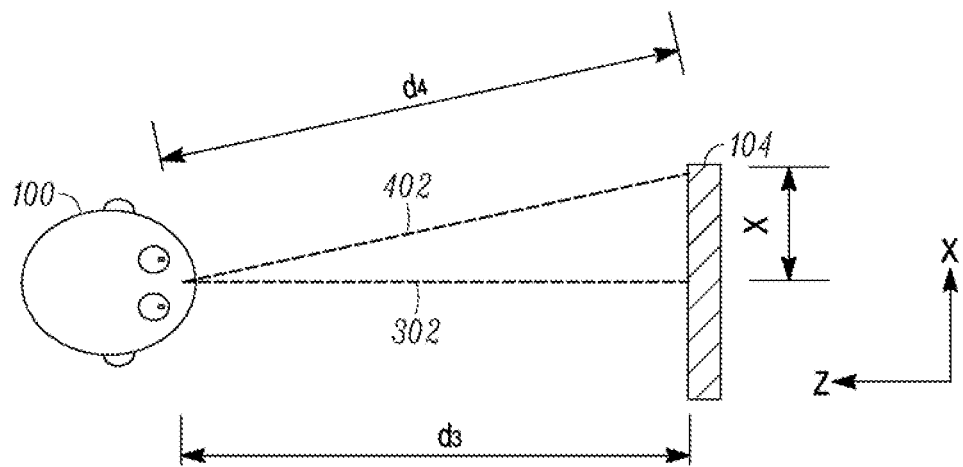
FIG. 4 depicts a user situated at the center of the display of the electronic device viewing a focus area of the display in accordance with some embodiments.
Figure 5:
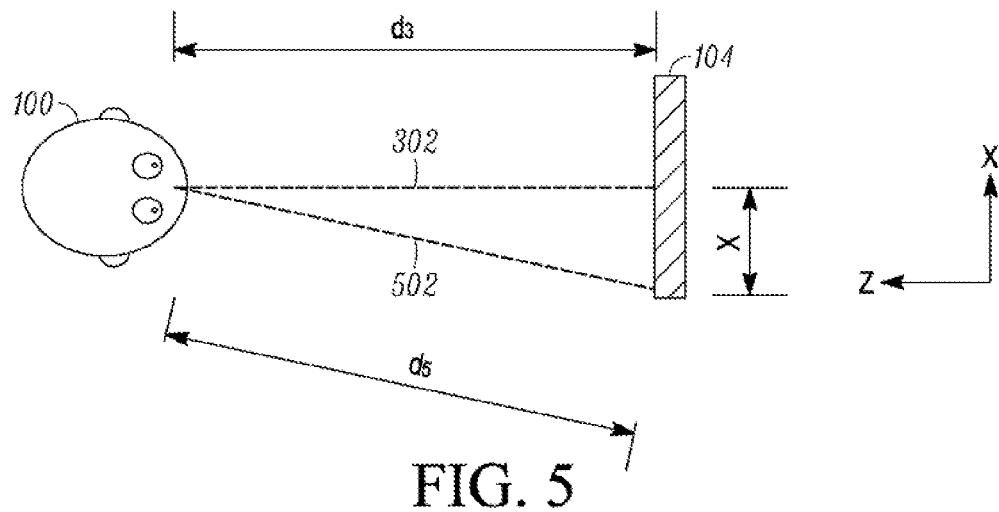
FIG. 5 depicts a user situated at the center of the display of the electronic device viewing another focus area of the display in accordance with some embodiments.
Figure 6:
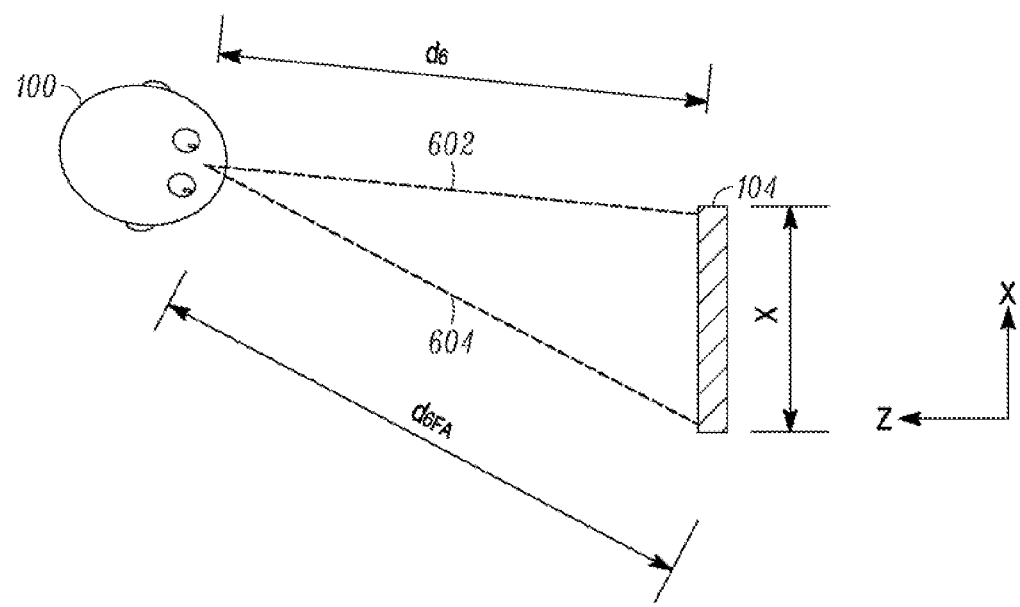
FIG. 6 depicts a user situated at an edge of the display of the electronic device viewing a focus area of the display in accordance with some embodiments.
Figure 7:
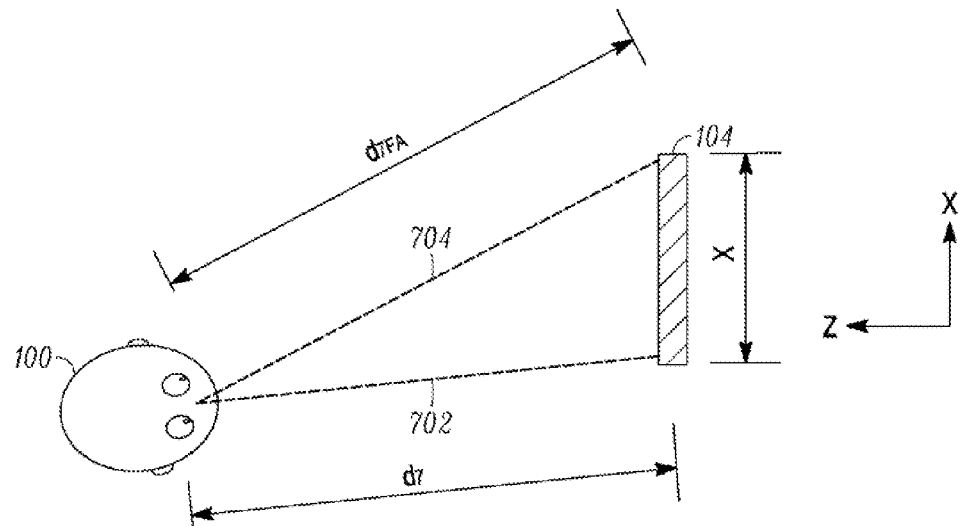
FIG. 7 depicts a user situated at another edge of the display of the electronic device viewing another focus area of the display in accordance with some embodiments.

FIGS. 3-5 depict examples of a user 100 situated at the center of the display 104 of the electronic device 102 in which embodiments may be implemented. FIGS. 6-7 depict examples of a user 100 situated at either edge of the display 104 of the electronic device 102 in which embodiments may be implemented. The user 100 and the display 104 are shown in a simplified top-down view in FIGS. 3-7. The electronic device 102 may measure a distance between the user 100 and the display 104, then determine a desired display resolution of the display 104, based on the distance and/or a focus area distance, as described below. The electronic device 102 may also determine whether the user 100 is exhibiting symptoms of presbyopia and determine a desired magnification factor based on if the user 100 is exhibiting symptoms of presbyopia. A request including the desired display resolution and/or the desired magnification factor may be transmitted to a server external to the electronic device 102. The electronic device 102 may subsequently receive data corresponding to an image, such as pictures and videos, at the desired display resolution and/or desired magnification factor from the server. The electronic device 102 may process the data and render the image on the display 104.

In FIG. 3, the user 100 may be viewing the center of the display 104, as denoted by the line 302. The electronic device 102 may measure a distance $d_3$ between the user 100 and the display 104 and determine a desired display resolution of the display 104 based on the measured distance $d_3$. The desired display resolution may be one of the display resolutions that the display 104 is capable of supporting and displaying. The distance $d_3$ shown in FIG. 3 may be considered the minimum distance between an eye of the user 100 and the display 104 when a pupil orientation of the user 100 is not taken into account. In contrast, if a pupil orientation of the user 100 is taken into account, a focus area distance between the display 104 and a pupil of the user 100 may be calculated. In FIG. 3, when the eyes and pupils of the user 100 view and focus on a region of the display 104 other than the center of the display 104, the focus area distance is between the pupils of the user 100 and the focused region of the display 104, and is greater than the minimum distance. However, when the user 100 views the center of the display 104 in FIG. 3, then the minimum distance is the distance $d_3$. In some embodiments, only the minimum distance between the user 100 and the display 104 is considered when determining the desired display resolution. In other embodiments, the pupil orientation of the user 100 may be considered when calculating the focus area distance and determining a desired display resolution based on the focus area distance (instead of the minimum distance).

FIGS. 4 and 5 depict the focus area distance when a user 100 is situated at the center of the display 104 but is focused on another region of the display 104 other than the center of the display 104. The minimum distance between the user 100 and the display 104 in FIGS. 4 and 5 is still the distance $d_3$. However, because the user 100 is focused on another region of the display 104, the focus area distance between the user 100 and the focused region of the display 104 is greater than the distance $d_3$. In particular, the user 100 may be focused on the left edge of the display 104 and the right edge of the display 104 as denoted by the lines 402 and 502, respectively, in FIGS. 4 and 5. In FIG. 4, the focus area distance $d_4$ is greater than the minimum distance $d_3$ and in FIG. 5, the focus area distance $d_5$ is greater than the minimum distance $d_3$.

Although the user 100 is shown focusing on the left edge and the right edge of the display 104 by the lines 402 and 502 in FIGS. 4 and 5, if the user 100 views and focuses on any region of the display 104 (other than the center of the display 104), the focus area distance would be greater than the minimum distance $d_3$. As the eyes of the user 100 focus on other regions of the display 104 other than the center, the focus area distance (e.g., $d_4$ or $d_5$) may be equal to the square root of the sum of the minimum distance (e.g., $d_3$) squared and the lateral distance x squared. The lateral distance x in FIGS. 4 and 5 is the distance between the center of the display 104 to the focused region of the display 104. Accordingly, the size $\Delta x$ of a particular theoretical pixel that can be perceived by the user 100 at the focused region of the display 104 will increase as the focus area distance (e.g., $d_4$ or $d_5$) increases, according to the equation $\Delta x = (\text{focus area distance}) * \pi/180 * 1/60$. The display resolution of the display 104 can therefore be reduced because the size Δx of a pixel may be larger without loss of detail or viewing experience to the user. In this case, the desired display resolution may be based on the focus area distance instead of the minimum distance. This may occur, for example, when a user is paying attention to a picture-in-picture image or animation, another inset graphic or video shown on the display, or a scrolling ticker along an edge of the display.

FIGS. 6 and 7 depict the focus area distance when a user 100 is situated at an edge of the display 104 but is focused on another region of the display 104 different from the edge nearest where the user 100 is situated. As mentioned previously, this may occur, for example, when a user is paying attention to a picture-in-picture image or animation, another inset graphic or video shown on the display, or a scrolling ticker along an edge of the display. In FIG. 6, the user 100 may be situated at the left edge of the display 104. In this case, the minimum distance between the user 100 and the display 104 is the distance $d_6$ to the left edge of the display 104, as denoted by the line 602. The user 100 may be viewing and focused on another region of the display 104, such as the right edge of the display 104. The focus area distance $d_{6FA}$ (denoted by the line 604) is greater than the minimum distance $d_6$. Similarly, in FIG. 7, the user 100 may be situated on the right edge of the display 104. The minimum distance between the user 100 and the display 104 is the distance $d_7$ to the right edge of the display 104, as denoted by the line 702. The user 100 may be viewing and focused on another region of the display 104, such as the left edge of the display 104. The focus area distance $d_{7FA}$ (denoted by the line 704) is greater than the minimum distance $d_7$.

Although the user 100 is shown focusing on the opposite edge of the display 104 from where the user 100 is situated in FIGS. 6 and 7, whenever the user 100 views and focuses on any region of the display 104 (other than the edge closest to the user 100), the focus area distance would be greater than the minimum distance (e.g., $d_6$ or $d_7$). Although not geometrically exact, the focus area distance (e.g., $d_{6FA}$ or $d_{7FA}$) may be approximated by the square root of the sum of the minimum distance (e.g., $d_6$ or $d_7$) squared and the lateral distance x squared. The focus area distance may also be calculated with trigonometry (e.g., the law of cosines) based on the minimum distance, the lateral distance x, and the angle between the display 104 and the line 602. The desired display resolution may be based on the focus area distance instead of the minimum distance.

In each of the scenarios described above in FIGS. 3-7, the electronic device 102 may measure a distance between the user 100 and the display 104, determine a desired display resolution based on the distance, and transmit a request including the desired display resolution to a server capable of supplying images. The electronic device 102 may also determine whether the user 100 is exhibiting symptoms of presbyopia and determine a desired magnification factor if the user 100 is exhibiting symptoms of presbyopia. In this case, the transmitted request may also include the desired magnification factor. In some embodiments, the electronic device 102 may also determine a pupil orientation of the user 100 with respect to the display 104 and calculate a focus area distance between the display 104 based on the pupil orientation and the distance between the user 100 and the display 104. The electronic device 102 may also determine a desired display resolution based on the focus area distance and transmit a request including the desired display resolution to the server. The pupil orientation of the user 100 may include determining a focus area on the display 104 of a pupil of the user 100.

If there is a change in the distance and/or pupil orientation, the electronic device 102 may determine a desired display resolution based on the change. In some embodiments, the electronic device 102 may determine a desired display resolution if the change exceeds a predetermined threshold. The predetermined threshold for a particular display 104 may be based on the dimensions of the display 104, the number of pixels and layout of the pixels of the display 104, and/or the visual acuity of the user 100 at particular distances from the display 104. In particular, the predetermined threshold can be based on whether a change in the distance or pupil orientation for a user 100 affects the viewable pixel size for the user 100 and therefore would cause a change to a different resolution of the display 104. For example, the average pixel size $R_D$ of the display 104 (corresponding to the maximum resolution the display 104 is capable of resolving a feature to) can be calculated as the square root of the quotient of the physical area of the display 104 divided by the total pixel count of the display 104. The visual acuity α in arc-minutes of the user 100 at a distance D from the display 104 can be calculated as $L/D*180/\pi*60$, where L is the size of a feature shown on the display 104. Accordingly, any feature within the visual acuity α cannot be distinguished by the user 100 as separate entities, i.e., the feature size L appears as a single entity within the visual acuity α.

Therefore, the smallest feature that can be resolved by the user 100 at any distance $D_i$ can be calculated as $L_i=D_i*(\alpha*\pi/180*1/60)$, and the corresponding desired display resolution can be calculated as $R_P=L_i/R_D$. When the smallest resolvable feature size is less than the average pixel size of the display 104 (i.e., $L_i<R_D$), then the desired display resolution can be increased to a higher resolution, if the display 104 supports a higher resolution. It should be noted that if the desired display resolution is changed, the same image is shown on the display 104 with more or less detail (depending on whether the desired display resolution has increased or decreased, respectively), not by reducing the number of pixels that are illuminated. As such, more or less data may be utilized to display the image at the desired display resolution.

In some embodiments, the electronic device 102 may measure the distance between the display 104 and the user 100 on a periodic basis and/or on a continuous basis. If changes to the desired display resolution are made too quickly when there is a change in the distance or pupil orientation, then it is possible the user 100 may observe a pulsing screen on the display 104. However, if changes to the desired display resolution are made faster than what the human eye can detect (e.g., ⅜ of a second), then the user 100 may not notice such changes. If changes to the desired display resolution are made too slowly, then it could be a nuisance to the user 100 to adjust focus too often. Changes to the desired display resolution may also be made when there is a transition on the display 104, e.g., when a page of an e-book is turned, when a new webpage is loaded, when the background or scene changes in a video, etc.

Figure 8:
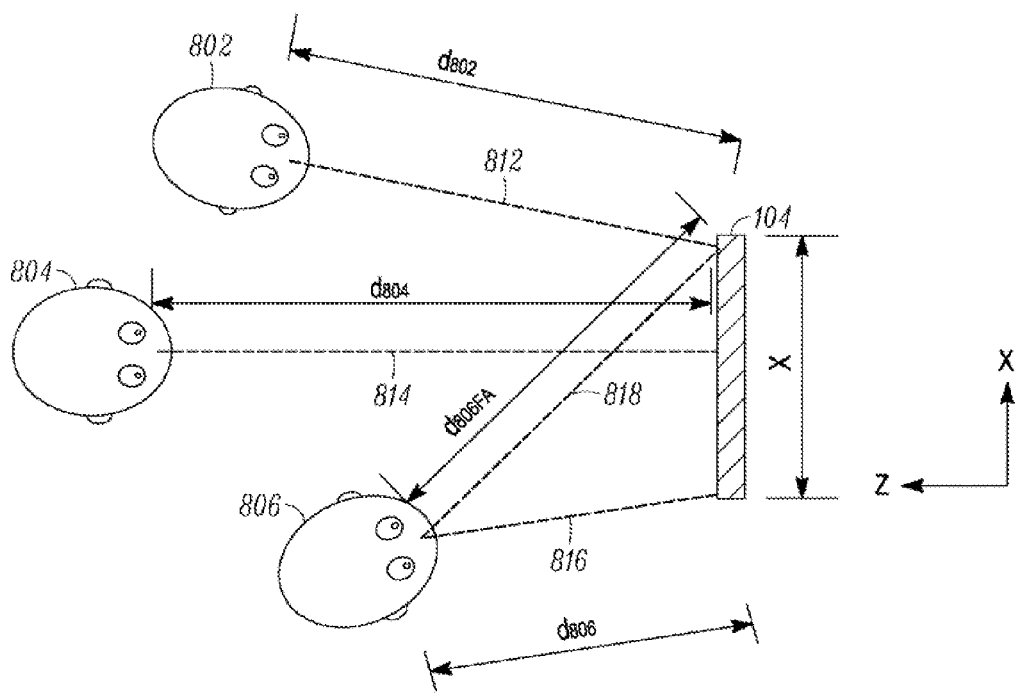
FIG. 8 depicts users viewing the display of the electronic device at different viewing angles in accordance with some embodiments.

FIG. 8 depicts multiple users 802, 804, and 806 viewing a display 104 of an electronic device 102 from different viewing angles and distances. The viewing angle of a particular user may be determined by where the user is situated with respect to the display 104. The distance for a particular user may be respectively measured between the user 802, 804, and 806 and the display 104. As described above, the minimum distance between a particular user and the display 104 may be the distance when pupil orientations of the users are not taken into account. In FIG. 8, the user 802 is at a minimum distance $d_{802}$ denoted by the line 812, the user 804 is farther away at a greater minimum distance $d_{804}$ denoted by the line 814, and the user 806 is closer at a minimum distance $d_{806}$ denoted by the line 816.

If all three users 802, 804, and 806 are simultaneously situated and viewing the display 104, the electronic device 102 may determine a desired display resolution of the display 104 based on the distance of the user closest to the display 104. In the case of FIG. 8, the user 806 is closest to the display 104, so the desired display resolution determined by the electronic device 102 may be based on the minimum distance $d_{806}$. The distance $d_{806}$ of the user 806 closest to the display 104 may be used to determine the desired display resolution so that the viewing experience of the user 806 is maximized. If the distances $d_{802}$ or $d_{804}$ of the users 802 and 804, respectively, were used to determine the desired display resolution, the desired display resolution could be lower and result in less sharpness and clarity on the display 104 as viewed by the user 806. However, by using the distance $d_{806}$, the desired display resolution may be relatively higher and the viewing experience of the users 802 and 804 may be more than optimal for those users. In some embodiments, the electronic device 102 may periodically recalculate the desired display resolution to account for changes in the distance between the display 104 and the users 802, 804, and/or 806. In other embodiments, the electronic device 102 can recalculate the desired display resolution if the electronic device 102 detects that the closest user 806 has moved or is no longer situated in front of the display 104. In further embodiments, the users may have an option to activate or deactivate whether changes in the display resolution and/or magnification will occur, e.g., if one of the users has presbyopia but the other users do not have presbyopia.

In some embodiments, the pupil orientation of the user closest to the display 104 may also be taken into account when determining the desired display resolution. Accordingly, in FIG. 8, the pupil orientation of the user 806 may be determined when the user 806 views and focuses on different regions of the display 104, other than the region of the display 104 closest to the user 806. When the user 806 views the right edge of the display 104, the distance $d_{806}$ is the minimum distance and can be used to determine the desired display resolution. When the user 806 views another region of the display 104, then the focus area distance $d_{806FA}$ may be calculated based on the pupil orientation of the user 806, as denoted by the line 818. The focus area distance $d_{806FA}$ may be greater than the distance $d_{806}$. Similar to the scenarios described above with respect to FIGS. 3-7, the focus area distance (e.g., $d_{806FA}$) may be approximated by the square root of the sum of the minimum distance (e.g., $d_{806}$) squared and the lateral distance x squared, or by calculating the focus area distance with trigonometry (e.g., the law of cosines).

Figure 9:
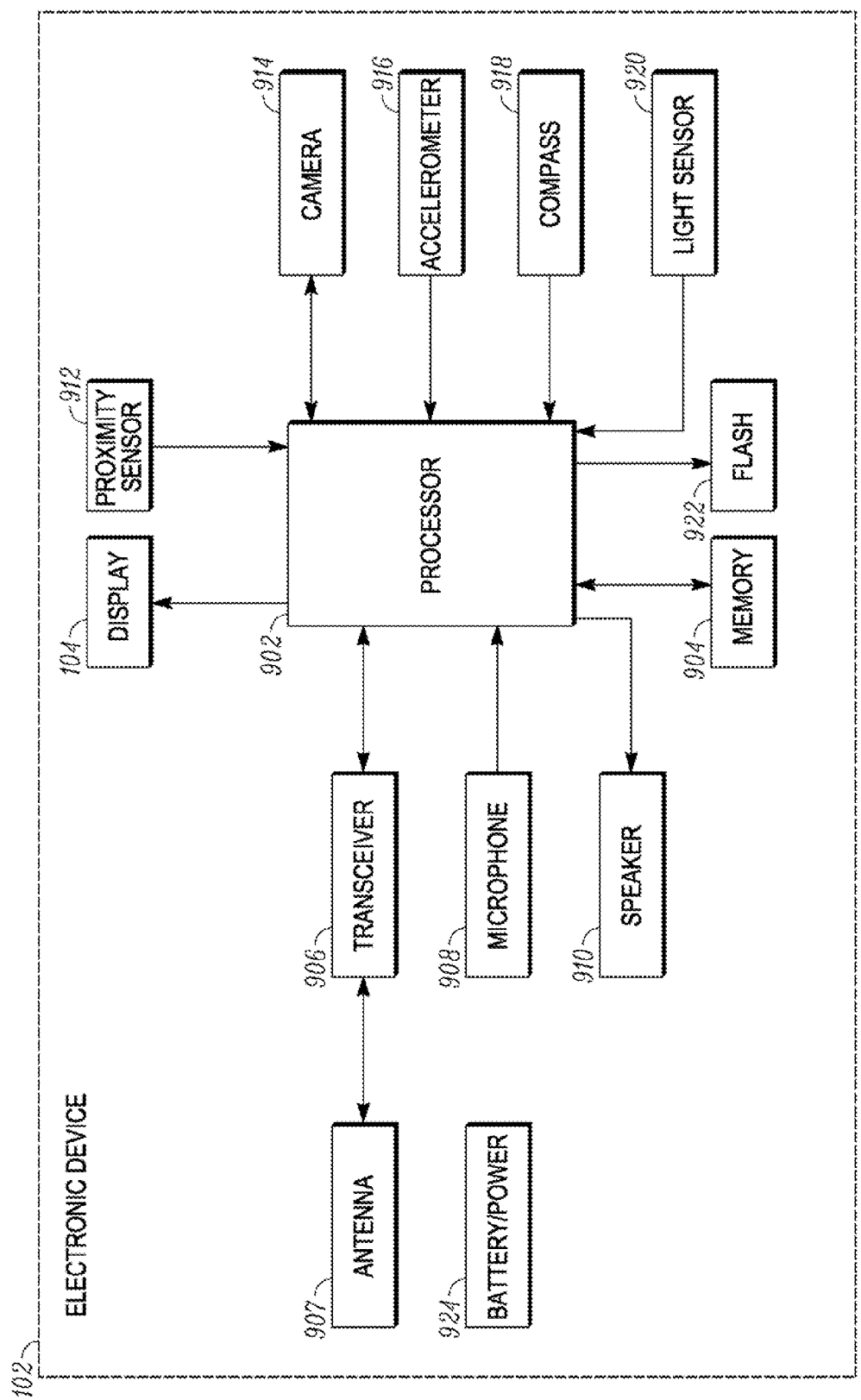
FIG. 9 is a block diagram of the electronic device in accordance with some embodiments.

FIG. 9 illustrates an example of an electronic device 102 in which embodiments may be implemented. The electronic device 102 may be stationary or portable and may be, for example, a smartphone, a cellular phone, a personal digital assistant, a tablet computer, a laptop computer, a networked television set, or the like. The electronic device 102 may include a display 104, a processor 902, a memory 904 (e.g., flash memory, memory card, hard drive, solid state drive, etc.), a transceiver 906, an antenna 907, a microphone 908, a speaker 910, a proximity sensor 912, a camera 914, an accelerometer 916, a compass 918, a light sensor 920, and a flash 922. A battery or power supply 924 may be included in the electronic device 102 for supplying, receiving, and/or distributing electrical power to components in the electronic device 102.

The transceiver 906 may be in communication with the antenna 907 so that data can be sent from and received to the electronic device 102. Alternately, data may be transmitted and/or received through a wired network connection. The data may include a request including a desired display resolution and/or a desired magnification factor that is transmitted to a server external to the electronic device 102. The server may supply the images, such as pictures and videos, to the electronic device 102. The data may also include the images received from the server that are at a particular display resolution. The transceiver 906 may be adapted to receive and transmit data over a wireless and/or wired connection. The transceiver may function in accordance with a 3GPP standard such as HSPA or LTE, an IEEE standard such as 802.16 or 802.15 or 802.11, or other standards. More particularly, the transceiver 906 may be a WWAN transceiver configured to communicate with a wide area network including one or more cell sites or base stations to communicatively connect the electronic device 102 to additional devices or components. Further, the transceiver 906 may be a WLAN and/or WPAN transceiver configured to connect the electronic device 102 to local area networks and/or personal area networks, such as a Bluetooth network.

The software in the memory 904 may include one or more separate programs or applications. The programs may have ordered listings of executable instructions for implementing logical functions. The software may include a suitable operating system of the electronic device 102, such as Android from Google, Inc., iOS from Apple, Inc., BlackBerry OS from Research in Motion Limited, Windows Phone from Microsoft Corporation, or Symbian from Nokia Corporation. The operating system essentially controls the execution of other computer programs, and provides scheduling, input-output control, file and data management, memory management, and communication control and related services.

The electronic device 102 may also include additional I/O components (not shown), such as keys, buttons, lights, LEDs, cursor control devices, haptic devices, etc. The display 104 and the additional I/O components may be considered to form portions of a user interface (e.g., portions of the electronic device 102 associated with presenting information to the user and/or receiving inputs from the user). In some embodiments, the display 104 is a touchscreen display composed of singular or combinations of display technologies such as electrophoretic displays, electronic paper, polyLED displays, OLED displays, AMOLED displays, liquid crystal displays, electrowetting displays, rotating ball displays, segmented displays, direct drive displays, passive-matrix displays, active-matrix displays, lenticular barriers, and/or others. Further, the display 104 can include a thin, transparent touch sensor component superimposed upon a display section that is viewable by a user. For example, such displays include capacitive touch screens, resistive touch screens, surface acoustic wave (SAW) touch screens, optical imaging touch screens, and the like. The display 104 may be capable of supporting one or more display resolutions, including 480p (852×480), PAL or 576i (720×576), 720p (1280×720), 1080p (1920×1080), UHDTV-4K (3840×2160), and UHDTV-8K (7680×4320), and aspect ratios, such as 4:3 and 16:9.

The processor 902 may optimize the viewing of a display 104 on the electronic device 102 by dynamically configuring the display resolution of a display 104 based on the distance between a user and the display 104. After a desired display resolution is determined, the transceiver 906 may transmit a request to a server with the desired display resolution. The distance between the user and the display 104 may be measured by the proximity sensor 912 and/or the camera 914 and communicated to the processor 902. The proximity sensor 912 may emit electromagnetic energy, such as a field or beam, and examine changes in the field or a return signal from the user being sensed. For example, the proximity sensor 912 may be an infrared sensor, an ultrasonic sensor, or other appropriate sensor. The camera 914 and/or the processor 902 may have object recognition and/or facial recognition capabilities to allow measurement of the distance between the user and the display 104. The light sensor 920 and the flash 922 may be utilized by the processor 902 to assist the camera 914 in measuring the distance by sensing a low-light environment and sufficiently illuminating the user, for example.

In some embodiments, the desired display resolution may be determined based on a pupil orientation of the user. The pupil orientation of a user may be determined by the camera 914 and/or the processor 902 using object recognition and/or facial recognition capabilities. The camera 914 may detect the pupil of the user and determine the orientation of the pupil with respect to the display. The light sensor 920 and the flash 922 may be utilized by the processor 902 to assist the camera 914 in determining the pupil orientation by sensing a low-light environment and sufficiently illuminating the eyes of the user. A focus area distance between the pupil of the user and the display 104 can be calculated by the processor 902 based on the distance and the pupil orientation. As described above, the focus area distance may include the distance between a pupil of the user and the display 104 when a pupil orientation of the user is taken into account. The focus area distance may be estimated by the square root of the sum of the minimum distance squared and the lateral distance x squared, or with trigonometry (e.g., the law of cosines). The minimum distance may be the distance between the user and the display 104 as initially measured. After the focus area distance is calculated, the desired display resolution may be determined based on the focus area distance, and as described above, a request including the desired display resolution may be transmitted to a server.

Changes in the distance between the user and the display 104 after an initial measurement may be detected by the antenna 907, the proximity sensor 912, the camera 914, the accelerometer 916, and/or the compass 918. Changes may be categorized into three major scenarios: (1) only the user changes position (i.e., the device remains stationary); (2) only the device changes position (i.e., the user remains stationary); and (3) both the user and the device change position. The components that can detect changes in the distance can vary depending on the scenario and may be used in combination with one another, as appropriate. For example, the proximity sensor 912 may detect scenarios (1) and (3) but not scenario (2), and the accelerometer 916 may detect scenario (2) but not scenarios (1) and (3). As another example, the camera 914 may be able to detect all three scenarios.

After a change in the distance has been detected, the proximity sensor 912 and/or the camera 914 may perform a new distance measurement. For example, the camera 914 may be the primary distance measurement component that measures the distance between the user and the display 104. In this case, the camera 914 may make an initial measurement of the distance and then be deactivated by the processor 902 so that less power is consumed by the camera 914. If a change in the distance is detected by another component, then the camera 914 may be reactivated to make another distance measurement. A new distance measurement may be performed in some embodiments if the change in the distance exceeds a predetermined threshold. In this way, insignificant changes in the distance will not unnecessarily change the display resolution of the display 104. In other embodiments, the distance may be measured on a periodic basis.

The antenna 907 may detect a change in the distance by sensing a change in the electromagnetic field emitted by the antenna 907. The change in the electromagnetic field may be caused by interactions between the user and the electronic device 102, such as a change in distance. For example, if the electronic device 102 and the user are relatively close, e.g., less than a few inches, then the antenna 907 may detect changes in the distance reliably. The proximity sensor 912 and/or the camera 914 may detect a change in the distance by comparing a previous distance measurement to a newer distance measurement. Changes in the distance may also be detected by the accelerometer 916 and/or the compass 918 by sensing shaking, changes in orientation, and other changes to physical aspects of the electronic device 102. The accelerometer 916 and/or the compass 918 may be based on a magnetoresistive sensor, a Hall effect sensor, or other appropriate sensor.

Changes in the pupil orientation after an initial determination may be detected by the camera 914. After a change in the pupil orientation has been detected, the camera 914 may perform a new pupil orientation measurement. A new pupil orientation determination may be performed in some embodiments if the change in the focus area distance that is calculated based on the pupil measurement exceeds a predetermined threshold. Insignificant changes in the focus area distance will not therefore unnecessarily change the display resolution of the display 104. In other embodiments, the pupil orientation may be determined and the focus area distance may be calculated on a periodic basis.

A visual acuity of the user, including whether user is exhibiting symptoms of presbyopia, may be determined by the camera 914 and/or may be entered by the user and stored in the memory 904. The visual acuity of the user may include information from an eyeglasses prescription or a contact lens prescription, for example, and may include distance vision measurements (e.g., for far vision), near vision measurements (e.g., for the reading portion of a bifocal lens), spherical corrections, cylindrical corrections (e.g., for astigmatism), axis (e.g., for astigmatism), refractive power, whether the user has a presbyopia condition, and/or other visual acuity measurements. The visual acuity of the user may also be specified as a fraction, e.g., 20/20. In some embodiments, the visual acuity of the user may be obtained by accessing an external database via the transceiver 906, such as to a medical records database or website. The external database may store the visual acuity of the user as entered by the user, a doctor, or another person. As one example, the camera 914 may perform facial recognition to determine the identity of the user and access the visual acuity of the user from the external database. As another example, the user may log into the external database to access the visual acuity of the user.

The visual acuity may be factored into the desired display resolution determination in conjunction with the distance and/or focus area distance. In some embodiments, the processor 902 may take the image being shown on the display 104 into account in determining whether the user 100 is exhibiting symptoms of presbyopia. For example, if small features, such as text, are being shown on the display 104 and the user 100 is exhibiting symptoms of presbyopia, then the processor 902 may determine that the user 100 is exhibiting symptoms of presbyopia. Symptoms of presbyopia may include squinting of the eyes of the user 100, the user 100 not wearing multifocal glasses when multifocal glasses are normally worn by the user 100, and/or back and forth z-axis movements of the electronic device 102.

The camera 914 and the processor 902 may be used to determine that the user 100 is exhibiting symptoms of presbyopia by recognizing a squinting of the eyes of the user 100. The camera 914 and/or the processor 902 may utilize facial recognition capabilities, for example, to recognizing the squinting of the eyes. The frequency and/or magnitude of the squinting may also be taken into account in making the determination. In one embodiment, the frequency and/or magnitude of the squinting may need to exceed a predetermined threshold in order to determine that the user 100 is exhibiting symptoms of presbyopia. The light sensor 920 and the flash 922 may be utilized by the processor 902 to assist the camera 914 in recognizing squinting of the eyes of the user 100 by sensing a low-light environment and sufficiently illuminating the eyes of the user 100.

The camera 914 and the processor 902 may also be used to determine that the user 100 is exhibiting symptoms of presbyopia by recognizing that multifocal glasses are not being worn by the user 100 when multifocal glasses are normally worn by the user 100. The user 100 may have input into the electronic device 102 that the user 100 normally wears multifocal glasses and/or multifocal contact lenses. In other embodiments, the processor 902 may access an external database via the transceiver 906, such as to a medical records database or website, to determine whether the user 100 normally wears multifocal glasses and/or multifocal contact lenses, as described above. Whether the user 100 normally wears multifocal glasses may be stored in the memory 904 for usage in determining whether the user 100 is exhibiting symptoms of presbyopia. The camera 914 and/or the processor 902 may utilize facial recognition capabilities, for example, to recognize that multifocal glasses are not being worn by the user 100. The light sensor 920 and the flash 922 may be utilized by the processor 902 to assist the camera 914 in recognizing whether multifocal glasses are being worn by the user 100 by sensing a low-light environment and sufficiently illuminating the user 100.

The user 100 may also input a level of presbyopia into the electronic device 102. The level of presbyopia may include information from an eyeglasses prescription or a contact lens prescription. For example, the specific powers of the different portions of multifocal glasses may be included as the level of presbyopia. In some embodiments, the processor 902 may access an external database via the transceiver 906, such as to a medical records database or website, to retrieve the level of presbyopia.

The accelerometer 916 and/or the camera 914 may be used to determine that the user 100 is exhibiting symptoms of presbyopia by identifying a back and forth movement of the electronic device 102. Often, persons with presbyopia will move the object being viewed, e.g., the electronic device 102, at varying distances in an attempt to focus on the object. This back and forth movement may be a symptom of presbyopia of the user 100. The frequency and/or magnitude of the back and forth vacillating movement may also be taken into account in making the determination. In one embodiment, the frequency and/or magnitude of the back and forth movement may need to exceed a predetermined threshold in order to determine that the user 100 is exhibiting symptoms of presbyopia.

Figure 10:
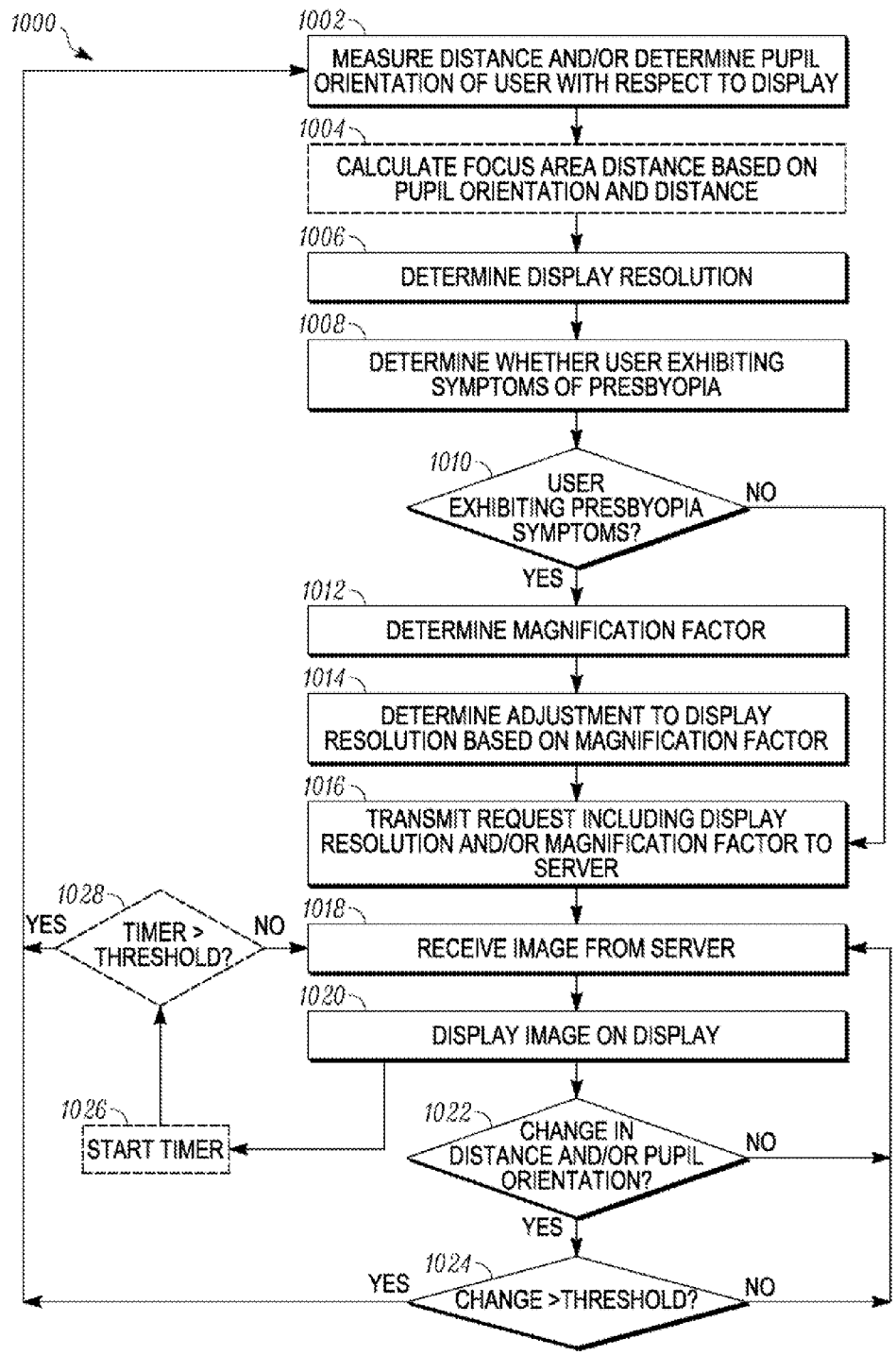
FIG. 10 is a flow diagram depicting the dynamic configuration of the display resolution and/or magnification factor of the display of the electronic device in accordance with some embodiments.

FIG. 10 is a flowchart of a method 1000 for dynamically configuring the display resolution and/or the magnification factor of a display 104 of an electronic device 102. In general, a computer program product in accordance with an embodiment includes a computer usable storage medium (e.g., standard random access memory (RAM), an optical disc, a universal serial bus (USB) drive, or the like) having computer-readable program code embodied therein, wherein the computer-readable program code is adapted to be executed by the processor 902 (e.g., working in conjunction with an operating system) to implement the methods described below. In this regard, the program code may be implemented in any desired language, and may be implemented as machine code, assembly code, byte code, interpretable source code or the like (e.g., via C, C++, Java, Actionscript, Objective-C, Javascript, CSS, XML, and/or others).

The method 1000 begins with measuring 1002 the distance between the user and the display of the electronic device. The distance may be measured by a proximity sensor or camera, for example. In some embodiments, the pupil orientation of the user may also be determined 1002 with respect to the display. The camera may determine the pupil orientation of the user, which can be used to determine the region of the display the user is viewing. If the pupil orientation is determined, then the focus area distance between the pupil of the user and the display may be calculated 1004 based on the distance and the pupil orientation. As described above, the focus area distance may be greater than the minimum distance between the user and the display, and may result in a different desired display resolution compared to only taking the minimum distance into account.

The desired display resolution may be determined 1006, based on the distance and/or the focus area distance. As described previously, the desired display resolution may have an inverse relationship with the distance and the focus area distance. In other words, as the distance between the user and the display increases, the display resolution may be decreased; and as the distance between the user and the display decreases, the display resolution may be increased.

Figure 12:
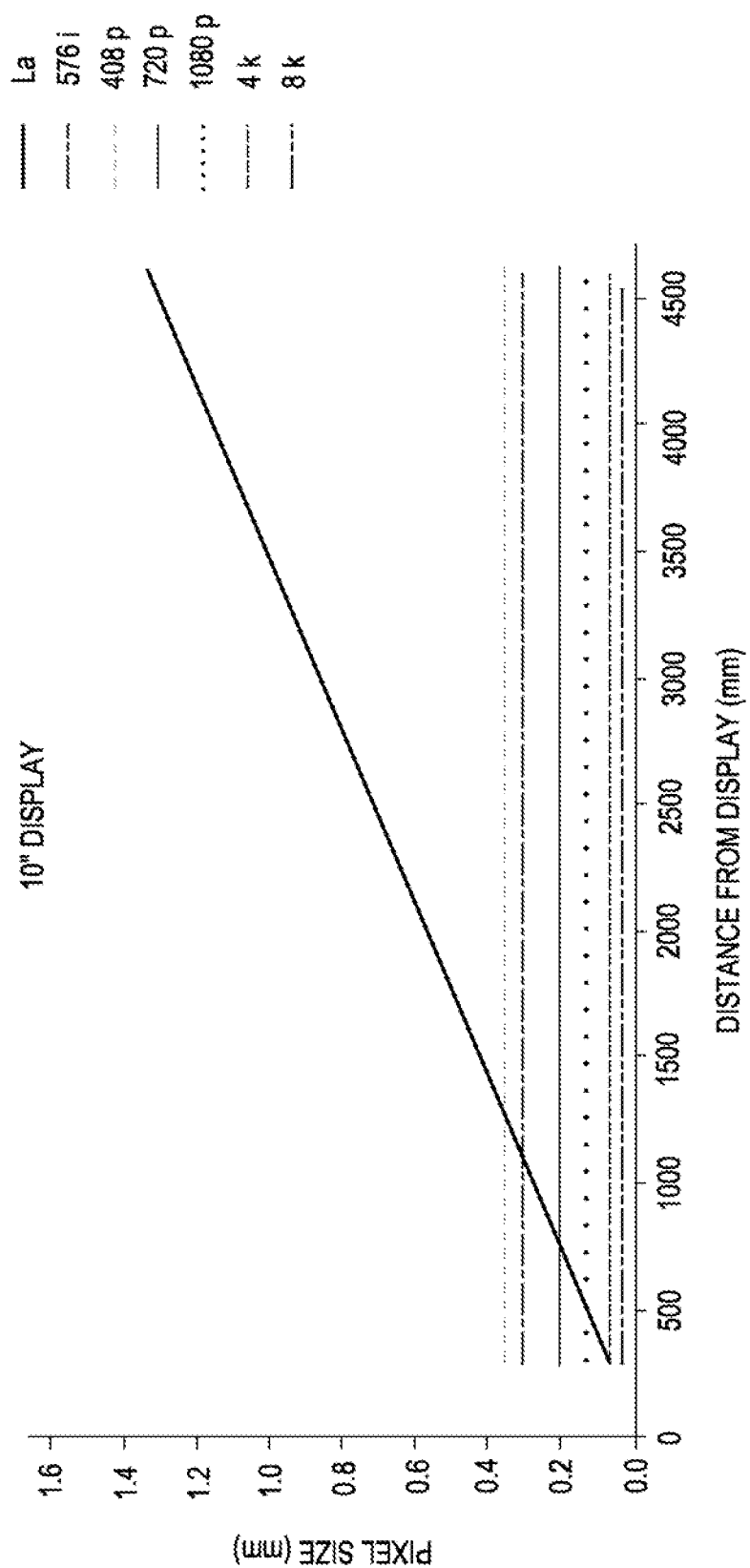
FIG. 12 is an exemplary graph showing points of transition for display resolutions of a display of the electronic device with respect to distance in accordance with some embodiments.
Figure 13:
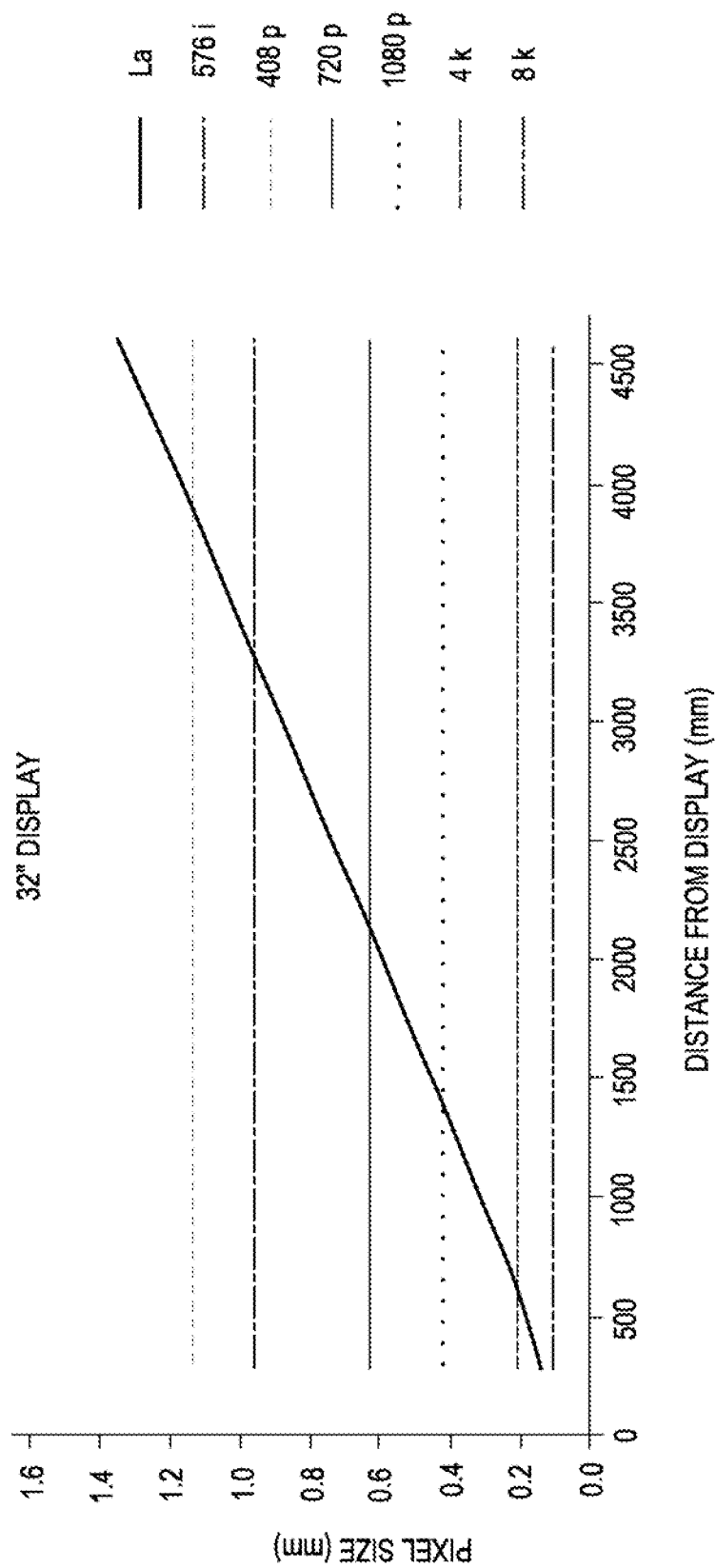
FIG. 13 is an exemplary graph showing points of transition for display resolutions of another display of the electronic device with respect to distance in accordance with some embodiments.
Figure 14:
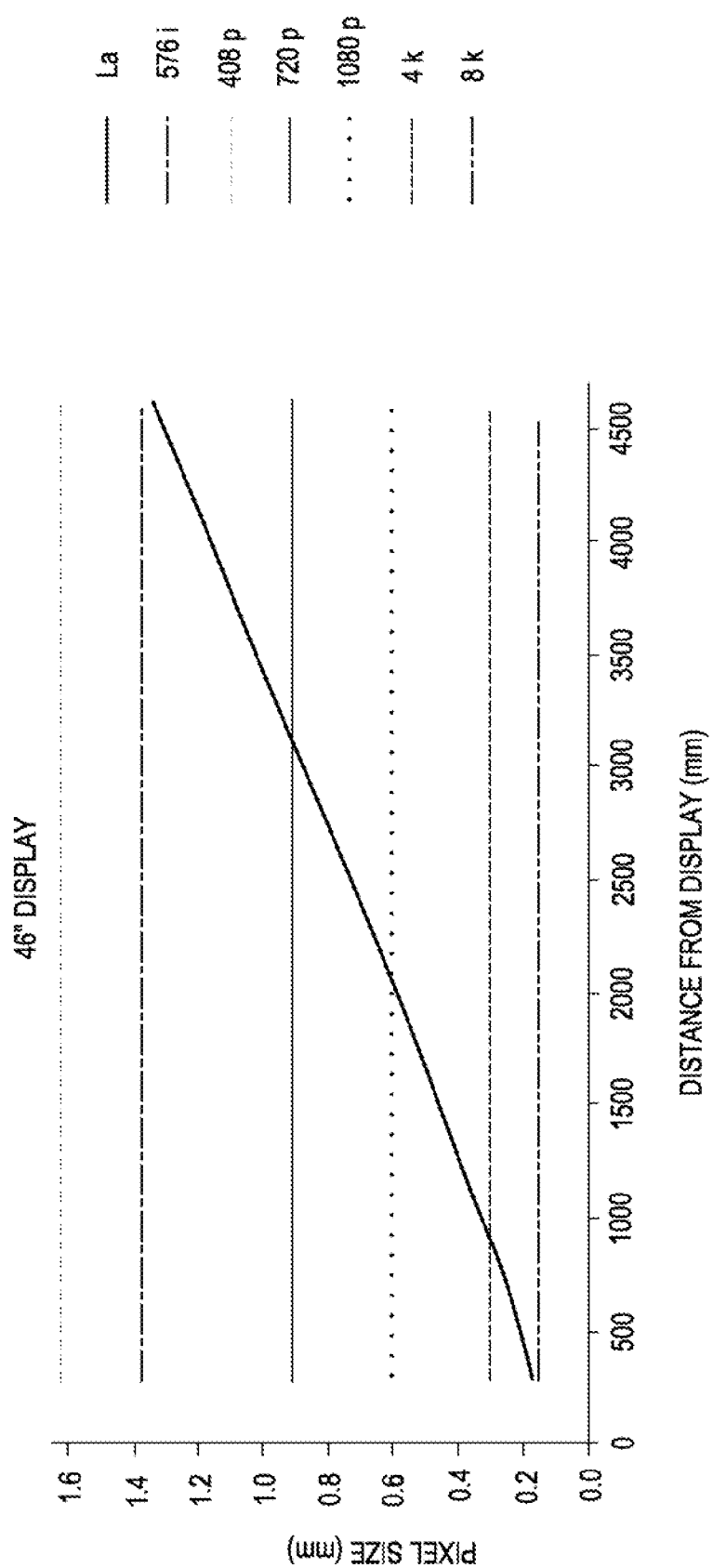
FIG. 14 is an exemplary graph showing points of transition for display resolutions of another display of the electronic device with respect to distance in accordance with some embodiments.

In certain embodiments, for a particular display size of a display 104, it is possible that a certain range of distances between the user and the display may lead to a particular desired display resolution, and that another certain range of distances (e.g., farther distances) may lead to a different desired display resolution. FIGS. 12-14 illustrate graphs showing exemplary points of transition to display resolutions for different sizes of a display 104 based on changes in the distance between a user and the display 104. In particular, the graph of FIG. 12 illustrates the points of transition for a 10 inch display, the graph of FIG. 13 illustrates the points of transition for a 32 inch display, and the graph of FIG. 14 illustrates the points of transition for a 46 inch display. In each of the graphs, the display resolutions supported by the theoretical display are 480p (852×480), PAL or 576i (720×576), 720p (1280×720), 1080p (1920×1080), UHDTV-4K (3840×2160), and UHDTV-8K (7680×4320), and the distance between the user and the display varies from one foot (300 mm) to 15 feet (4.572 meters).

As the distance between the user and the display increases, the desired display resolution can switch to a particular resolution when the solid line La in the graphs of FIGS. 12-14 crosses the dotted line corresponding to the resolution. It should be noted that the display resolution may only change to a particular desired display resolution if the display resolution is supported by the display. For example, in FIG. 12 for a 10 inch display, for distances below approximately 189 mm, the desired display resolution can be UHDTV-8K; for distances between approximately 189 mm and approximately 437 mm, the desired display resolution can be UHDTV-4K; for distances between approximately 437 mm and approximately 682 mm, the desired display resolution can be 1080p; for distances between approximately 682 mm and approximately 1025 mm, the desired display resolution can be 720p; for distances between approximately 1025 mm and approximately 1213 mm, the desired display resolution can be 480p;

and for distances above approximately 1213 mm, the desired display resolution can be 576i.

In FIG. 13 for a 32 inch display, for distances below approximately 604 mm, the desired display resolution can be UHDTV-8K; for distances between approximately 604 mm and 1397 mm, the desired display resolution can be UHDTV-4K; for distances between approximately 1397 mm and approximately 2183 mm, the desired display resolution can be 1080p; for distances between approximately 2183 mm and approximately 3280 mm, the desired display resolution can be 720p; for distances between approximately 3280 mm and approximately 3881 mm, the desired display resolution can be 480p; and for distances above approximately 3881 mm, the desired display resolution can be 576i. In FIG. 14 for a 46 inch display, for distances below approximately 868 mm, the desired display resolution can be UHDTV-8K; for distances between approximately 868 mm and approximately 2009 mm, the desired display resolution can be UHDTV-4K; for distances between approximately 2009 mm and approximately 3138 mm, the desired display resolution can be 1080p; for distances between approximately 3138 mm and approximately 4714 mm, the desired display resolution can be 720p; for distances between approximately 4714 mm and approximately 5579 mm, the desired display resolution can be 480p; and for distances above approximately 5579 mm, the desired display resolution can be 576i.

Returning to FIG. 10, whether the user is exhibiting symptoms of presbyopia may be determined 1008, and is described in more detail below with reference to FIG. 11. If the user is exhibiting 1010 symptoms of presbyopia, then the method 1000 may determine 1012 a desired magnification factor for images to be shown on the display of the electronic device, based on the level of presbyopia exhibited by the user. The display resolution that was previously determined 1006 may be adjusted 1014, based on the magnification factor.

In some embodiments, the magnification factor may be determined based on a calibration of the display to a particular user with presbyopia. For example, the user could hold the electronic device at at least one distance $D_i$ while the magnification of a calibration image is increased and/or decreased until the user deems the calibration image satisfactory. The calibration image may include an image, text, etc. After the calibration image is deemed satisfactory, the ratio $\beta_i = P_i/D_i$ of the distance $D_i$ between the user and the display and the magnification $P_i$ of the calibration image may be stored. The ratio $\beta_i$ for this particular user may be used to determine the magnification factor for the user when viewing different displays that support a variety of display resolutions. Accordingly, when the distance between the user and the display is $D_2$, the appropriate magnification factor $P_2$ at that distance can be calculated as $P_2 = D_2 * \beta_i$. The desired display resolution may also be adjusted 1014 based on the magnification factor $\beta_i$. In particular, if the ratio $\beta_i$ is less than or equal to the visual acuity $\alpha$ (described above), then the desired display resolution may be based on the ratio $\beta_i$ instead of $\alpha$. In particular, the smallest feature resolvable by the user can be calculated as $L_i = D_i * \beta_i$, and the corresponding desired display resolution can be calculated as $R_P = L_i/R_D$. In some embodiments, magnification and changes in the desired display resolution based on the magnification may occur when users with presbyopia are reading text, such as news, webpages, and the like. When users with presbyopia are viewing images, such as videos, animation, and the like, there may be changes in the desired display resolution based on the distance between the display and the user, and no magnification of the images.

The desired display resolution may be one of the display resolutions that is supported by the display. A request indicating the desired display resolution and/or the desired magnification factor may be transmitted 1016 to a server external to the electronic device, following an adjustment 1014 to the display resolution, or if the user is not exhibiting 1010 symptoms of presbyopia. The server may be capable of supplying images, such as pictures or videos, to the electronic device. In some embodiments, the request may ask for an increment or a decrement to the current display resolution of the display. The increment or the decrement may be based on the desired display resolution that was determined 1008. As an example, the display may support four display resolutions (e.g., 480× 320, 720p, 960×640, and 1080p), the display is currently displaying a video at a display resolution of 480×320, and the server can supply video at only three display resolutions (e.g., 480×320, 720p, and 1080p). If the distance between the user and the display decreases such that the desired display resolution should be increased to provide more sharpness and clarity, then the request transmitted 1010 to the server may include a specific request to supply the video at a specific higher display resolution (e.g., 720p or 1080p), or may include an increment to the next available higher display resolution (in this case, 720p).

After the request is transmitted 1016 from the electronic device, data representing the image may be received 1018 from the server. In one embodiment, the received image may be at a particular desired display resolution that was determined 1006, such as if the user is not exhibiting symptoms of presbyopia. In another embodiment, the received image may be at an adjusted display resolution that was determined 1014 and/or at a magnification factor that was determined 1012, such as if the user is exhibiting symptoms of presbyopia. In a further embodiment, the received image may be at a desired display resolution that was determined 1006 or at an adjusted display resolution that was determined 1014. In this embodiment, the image may be modified by a processor of the electronic device based on the desired magnification factor that was determined 1012, after the image has been received from the server. In a further embodiment, the received image may be at a different display resolution based on a request including an increment or decrement to the display resolution, as described above. The image may be rendered and displayed 1020 on the display. In some embodiments, the requested desired display resolution may not be supported by the server. In this case, the server can provide an image at a display resolution supported by the server that is nearest to but above the requested desired display resolution.

The method 1000 may determine 1022 whether there has been a change to the distance between the user and the display or a change in the pupil orientation of the user as previously described. If a change to the distance or pupil orientation has been detected, then the method 1000 may determine 1024 whether the change is greater than a predetermined threshold. In the case of a change in pupil orientation, the focus area distance that is calculated based on the pupil orientation may be compared 1024 to a predetermined threshold. If the change to the distance or focus area distance is greater than the predetermined threshold, then the method 1000 may return to measure 1002 the distance between the user and the display or to determine the pupil orientation of the user. However, if the change to the distance or focus area distance is not greater than the predetermined threshold, then the method 1000 may continue to receive 1018 and display 1020 the image received from the server. The method 1000 may also continue to receive 1018 and display 1020 the image from the server if it is determined 1024 that there has been no change in the distance or pupil orientation of the user.

In some embodiments, after displaying 1020 the image on the display, the method 1000 may start 1026 a timer, such as in the processor of the electronic device. In this case, the measurement of the distance or determination of the pupil orientation of the user may be performed on a periodic basis. Accordingly, the method 1000 may determine 1028 whether the timer has exceeded a time threshold. If the timer has exceeded the time threshold, then the distance between the user and the display may be measured 1002 and/or the pupil orientation of the user may be determined 1002. However, if the timer has not exceeded the time threshold, then the method 1000 may continue to receive 1018 and display 1020 the image from the server.

Figure 11:
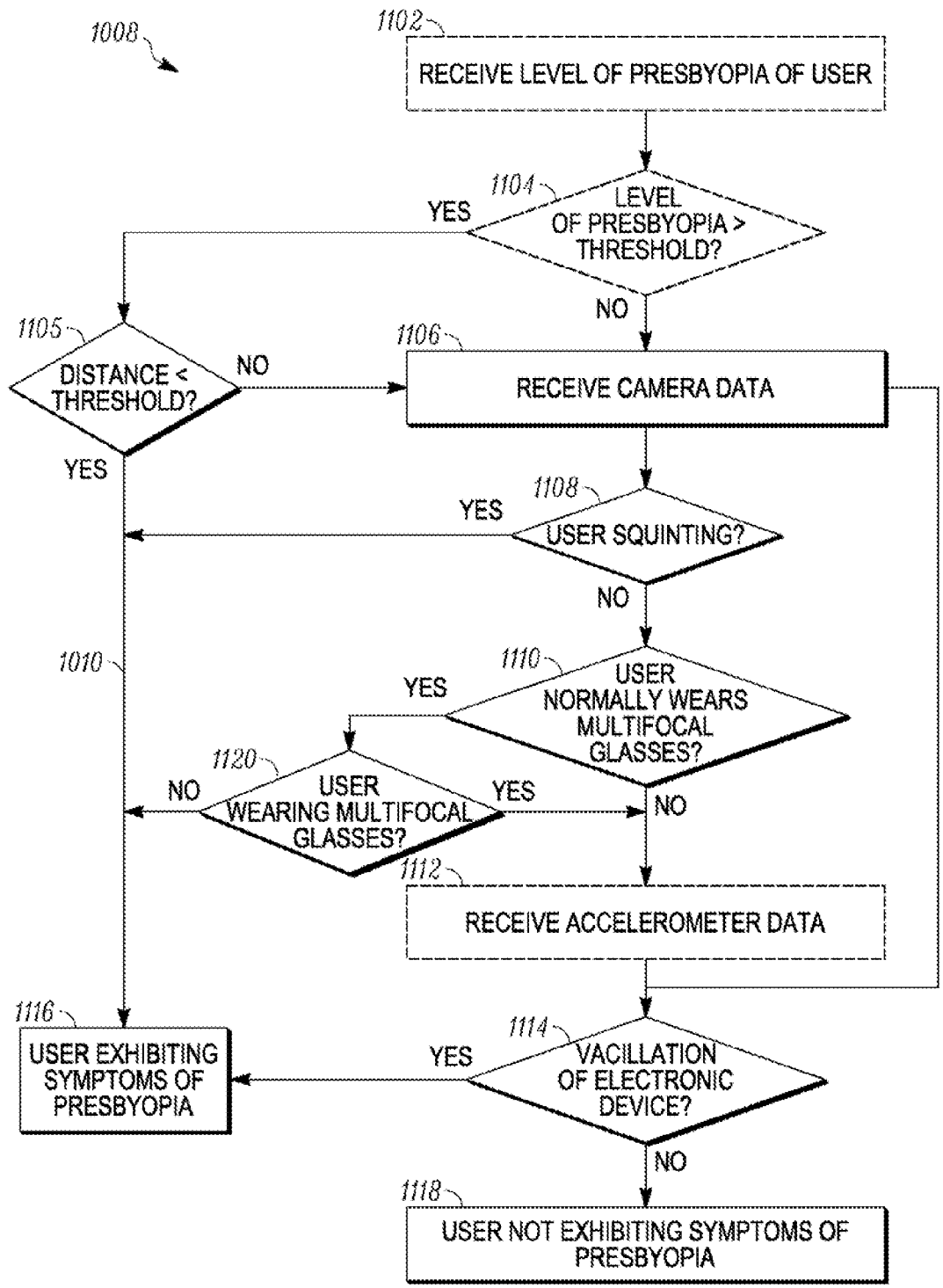
FIG. 11 is a flow diagram depicting the determination of whether a user is exhibiting symptoms of presbyopia in accordance with some embodiments.

FIG. 11 is a flowchart of a method 1008 that corresponds to determining 1008 whether the user is exhibiting symptoms of presbyopia in the method 1000 of FIG. 10. The level of presbyopia of the user may be optionally received 1102. The user may manually input the level of presbyopia, such as information from an eyeglasses prescription or a contact lens prescription. If the level of presbyopia is determined 1104 to not be greater than the predetermined threshold, then the method 1008 may continue and receive 1106 data from a camera of the electronic device. If the level of presbyopia is determined 1104 to be greater than a predetermined threshold, then the method 1008 may continue to determine 1105 whether the distance between the user and the electronic device is below a minimum distance threshold. If the distance is below the minimum distance threshold, then the method 1008 may determine 1116 that the user is exhibiting symptoms of presbyopia. In this case, the user may not outwardly exhibit symptoms of presbyopia but the distance between the user and the electronic device is small enough that it can be assumed that the user has presbyopia and that vision correction, e.g., a change to the display resolution and/or magnification, is warranted.

If the distance is not below the minimum distance threshold, then the method 1008 may continue and receive 1106 data from a camera of the electronic device. The data from the camera that is received 1106 may include facial recognition and/or object recognition information. The data from the camera may be used to determine 1108 whether the user is squinting. The frequency and/or magnitude of the squinting may also be taken into account in making the determination. If the user is determined 1108 to be squinting, then the method 1008 may determine 1116 that the user is exhibiting symptoms of presbyopia. If the user is not determined 1008 to be squinting, then the method 1008 may continue and determine 1110 whether the user normally wears multifocal corrective lenses, such as glasses or contact lenses.

Whether the user normally wears multifocal corrective lenses may be stored in a memory of the electronic device. If the user is determined 1110 to normally wear multifocal corrective lenses, then it may be determined 1120 whether the user is wearing the multifocal corrective lenses. The camera data received 1106 may be utilized to determine 1120 whether the user is wearing multifocal corrective lenses. In some embodiments, the user may manually input whether multifocal corrective lenses are being worn when doing the determination 1120. This may be the case, for example, when the user is wearing multifocal eyeglasses with progressive lenses, or is wearing multifocal contact lenses. If it is determined 1120 that the user is not wearing multifocal corrective lenses and should be, then the method 1008 may determine 1116 that the user is exhibiting symptoms of presbyopia. If it is determined 1120 that the user is wearing multifocal corrective lenses (or if it is determined 1110 that the user does not normally wear multifocal corrective lenses), then the method 1008 may continue and receive 1112 data from an accelerometer of the electronic device.

The accelerometer data that is received 1112 may be utilized to determine 1114 whether there is a back and forth movement of the electronic device by the user. Camera data that is received 1106 may also be utilized to determine 1114 whether there is a back and forth movement of the electronic device by the user. The frequency and/or magnitude of the vacillating movement may also be taken into account in making the determination. If it is determined 1114 that there is a back and forth movement of the electronic device, then the method 1008 may determine 1116 that the user is exhibiting symptoms of presbyopia. However, if it determined 1114 that there is not a back and forth movement of the electronic device, then the method 1008 may determine 1118 that the user is not exhibiting symptoms of presbyopia.

Thus, it should be clear from the preceding disclosure that systems and methods for dynamically configuring a display of an electronic device to a display resolution may be performed without noticeable impact on the user viewing experience. The systems and methods advantageously reduce the amount of data transferred between an electronic device and a server supplying an image, and may result in bandwidth, processing, and power savings.

This disclosure is intended to explain how to fashion and use various embodiments in accordance with the technology rather than to limit the true, intended, and fair scope and spirit thereof. The foregoing description is not intended to be exhaustive or to be limited to the precise forms disclosed. Modifications or variations are possible in light of the above teachings. The embodiment(s) were chosen and described to provide the best illustration of the principle of the described technology and its practical application, and to enable one of ordinary skill in the art to utilize the technology in various embodiments and with various modifications as are suited to the particular use contemplated. All such modifications and variations are within the scope of the embodiments as determined by the appended claims, as may be amended during the pendency of this application for patent, and all equivalents thereof, when interpreted in accordance with the breadth to which they are fairly, legally and equitably entitled.

The invention claimed is:

1. A method of configuring a display of an electronic device, wherein the display is capable of supporting a plurality of display resolutions, the method comprising:
   measuring a distance between the display and a user of the electronic device;
   determining, using a processor, a desired display resolution of the display based on the distance, wherein the desired display resolution is one of the plurality of display resolutions;
   determining, using the processor, that the user is exhibiting symptoms of presbyopia, by:
      identifying a series of movements of the electronic device in a z-axis direction, the series of movements comprising a forwards movement of the electronic device and a backwards movement of the electronic device, and
      determining that a frequency of the series of movements exceeds a predetermined threshold frequency;
   determining a desired magnification factor, based on the determining that the user is exhibiting symptoms of presbyopia, after determining that the series of movements is complete; and
   transmitting a request from the processor to a server external to the electronic device, the request indicating the desired magnification factor, wherein the server is capable of supplying an image according to the desired magnification factor.

2. The method of claim 1, further comprising:
comparing the distance to a minimum distance threshold, using the processor; and determining the desired magnification factor, if the distance is less than the minimum distance threshold.

3. The method of claim 1, wherein determining whether the user is exhibiting symptoms of presbyopia comprises:
recognizing squinting of an eye of the user, using a camera of the electronic device and the processor.

4. The method of claim 1, wherein determining whether the user is exhibiting symptoms of presbyopia comprises:
determining that the user normally wears multifocal glasses; and
recognizing that the multifocal glasses are not being worn by the user, using a camera of the electronic device and the processor, if it is determined that the user normally wears the multifocal glasses.

5. The method of claim 1, wherein identifying the series of movements comprises:
detecting a change in the distance; and
identifying the series of movements, if the change in the distance exceeds a predetermined back and forth distance threshold.

6. The method of claim 1, wherein:
determining whether the user is exhibiting symptoms of presbyopia comprises:
receiving a level of presbyopia of the user at the processor; and
determining the desired magnification factor comprises:
determining the desired magnification factor based on the level of presbyopia.

7. The method of claim 1, wherein transmitting the request comprises:
transmitting the request including a specific format of the image, from the processor to the server, wherein the specific format is based on one or more of: the desired display resolution or the desired magnification factor.

8. The method of claim 1, wherein measuring the distance between the display and the user comprises:
measuring the distance between the display and the user on a periodic basis.

9. The method of claim 1, further comprising:
receiving the image as part of a video, from the server at the processor, at one or more of: the desired display resolution or the desired magnification factor; and
displaying the image on the display, using the processor, when a scene changes in the video.

10. The method of claim 1, further comprising:
receiving the image at the desired display resolution from the server at the processor;
modifying the image based on the desired magnification factor to produce a magnified image, using the processor; and
displaying the magnified image on the display, using the processor.

11. The method of claim 1, further comprising:
receiving the image at a different display resolution from the server at the processor, wherein the different display resolution is based on the request;
modifying the image based on the desired magnification factor to produce a magnified image, using the processor; and
displaying the magnified image on the display, using the processor.

12. An electronic device, comprising:
a display capable of supporting a plurality of display resolutions;
a distance measurement component for measuring a distance between the display and a user of the electronic device;
a presbyopia detection component for determining presbyopia data associated with the user, the presbyopia detection component configured to transmit the presbyopia data;
a transceiver; and
a processor coupled to the display, the distance measurement component, the presbyopia detection component, and the transceiver, the processor configured to perform operations comprising:
receiving the distance from the distance measurement component;
determining a desired display resolution of the display based on the distance, wherein the desired display resolution is one of the plurality of display resolutions;
receiving the presbyopia data from the presbyopia detection component;
determining that the user is exhibiting symptoms of presbyopia, by:
identifying a series of movements of the electronic device in a z-axis direction, the series of movements comprising a forwards movement of the electronic device and a backwards movement of the electronic device, and
determining that a frequency of the series of movements exceeds a predetermined threshold frequency;
determining a desired magnification factor based on the presbyopia data, based on the determining that the user is exhibiting symptoms of presbyopia, after determining that the series of movements is complete; and
transmitting a request to a server external to the electronic device, the request indicating the desired magnification factor, wherein the server is capable of supplying an image according to the desired magnification factor.

13. The electronic device of claim 12, wherein the distance measurement component comprises one or more of:
a proximity sensor; or
a camera.

14. The electronic device of claim 12, wherein the processor is further configured to perform operations comprising:
comparing the distance to a minimum distance threshold; and
determining the desired magnification factor, if the distance is less than the minimum distance threshold.

15. The electronic device of claim 12, further comprising:
a camera of the electronic device for capturing images including eyes of the user; and
a facial recognition component coupled to the processor and the camera, the facial recognition component for recognizing a squinting of an eye of the user, wherein the camera is configured for capturing images including eyes of the user;
wherein the processor is configured to perform the determining of whether the user is exhibiting symptoms of presbyopia comprising:
determining that the user is exhibiting symptoms of presbyopia, if the facial recognition component recognizes the squinting of the eyes of the user.

16. The electronic device of claim 12, further comprising:
a camera of the electronic device for capturing images including multifocal glasses worn by the user;
a facial recognition component coupled to the processor and the camera, the facial recognition component for recognizing whether the multifocal glasses are being worn by the user; and
a memory coupled to the facial recognition component and the processor, the memory for storing whether the user normally wears the multifocal glasses;
wherein the processor is configured to perform the determining of whether the user is exhibiting symptoms of presbyopia comprising:
determining that the user is exhibiting symptoms of presbyopia, if the facial recognition component recognizes that the multifocal glasses are not being worn by the user and if the user normally wears the multifocal glasses.

17. The electronic device of claim 12, further comprising:
a memory coupled to the processor, the memory for storing a level of presbyopia of the user;
wherein:
the processor is configured to perform the determining of whether the user is exhibiting symptoms of presbyopia comprising:
receiving the level of presbyopia of the user; and
storing the level of presbyopia of the user in the memory;
the processor is configured to perform the determining of the desired magnification factor comprising:
determining the desired magnification factor based on the level of presbyopia.

18. The electronic device of claim 12, where the processor is configured to perform transmitting the request comprising:
transmitting the request including a specific format of the image to the server, wherein the specific format is based on one or more of: the desired display resolution or the desired magnification factor.

19. The electronic device of claim 12, wherein:
the transceiver is configured to receive the image at the desired display resolution from the server;
the processor is further configured to modify the image based on the desired magnification factor to produce a magnified image; and
the display is configured to show the magnified image.

20. The electronic device of claim 12, wherein the processor is further configured to perform operations comprising:
receiving, from the server via the transceiver, the image at a different display resolution, wherein the different display resolution is based on the request;
modifying the image based on the desired magnification factor to produce a magnified image; and
displaying the magnified image on the display.

21. The electronic device of claim 12:
wherein the presbyopia detection component comprises an accelerometer.

22. The electronic device of claim 12, wherein the processor is configured to identify the series of movements by:
detecting a change in the distance; and
identifying the series of movements, if the change in the distance exceeds a predetermined back and forth distance threshold.

* * * * *